(12) United States Patent
Nelson et al.

(10) Patent No.: US 11,265,341 B1
(45) Date of Patent: Mar. 1, 2022

(54) ADAPTATION OF BLOCKCHAIN CONSENSUS CRITERIA BASED ON A COMPUTING CONTEXT

(71) Applicant: T-MOBILE INNOVATIONS LLC, Overland Park, KS (US)

(72) Inventors: Tracy L. Nelson, Overland Park, KS (US); Lyle W. Paczkowski, Mission Hills, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 300 days.

(21) Appl. No.: 16/676,412

(22) Filed: Nov. 6, 2019

(51) Int. Cl.
H04L 29/06 (2006.01)
G06F 16/27 (2019.01)

(52) U.S. Cl.
CPC .......... H04L 63/1433 (2013.01); G06F 16/27 (2019.01); H04L 63/20 (2013.01); H04L 2209/38 (2013.01)

(58) Field of Classification Search
CPC . H04L 63/1433; H04L 63/20; H04L 2209/38; G06F 16/27
See application file for complete search history.

(56) References Cited

U.S. PATENT DOCUMENTS

| | | | |
|---|---|---|---|
| 11,121,859 B1* | 9/2021 | Mishra | G06F 9/542 |
| 2020/0112443 A1* | 4/2020 | Todd | H04L 9/14 |
| 2020/0286089 A1* | 9/2020 | Cleaver | G06Q 20/405 |
| 2020/0396244 A1* | 12/2020 | Paturi | G06N 5/022 |

OTHER PUBLICATIONS

Yu, Lei et al. "Low powered blockchain consensus protocols based on consistent hash." Frontiers of Information Technology & Electronic Engineering 20: 1361-1377. (Year: 2019).*
Backman, Jere et al. "Blockchain network slice broker in 5G: Slice leasing in factory of the future use case." 2017 Internet of Things Business Models, Users, and Networks: 1-8. (Year: 2017).*
Nour, Boubakr et al. "A Blockchain-Based Network Slice Broker for 5G Services." IEEE Networking Letters 1: 99-102. (Year: 2019).*
Dorri, Ali et al. "LSB: A Lightweight Scalable BlockChain for IoT Security and Anonymity." J. Parallel Distributed Comput. 134: 180-197. (Year: 2019).*

* cited by examiner

Primary Examiner — John M MacIlwinen

(57) ABSTRACT

A method of dynamically adapting a blockchain consensus criteria. The method comprises evaluating a first computing context by a consensus criteria adaptation application executing on a computer, wherein the first context comprises a first current vulnerability to cyber threats and an operational importance of a blockchain, based on evaluating the first computing context, adapting a first blockchain validity consensus criteria by the adaptation application, where the first consensus criteria identifies a first minimum number of consensus voting server computers, a first minimum percentage of approvals among voting server computers, and a first nonce calculation difficulty, applying the first consensus criteria to a first block requested to be added to the first blockchain, and determining, based on applying the first consensus criteria, that the first block is approved to be added to the first blockchain.

19 Claims, 8 Drawing Sheets

ADAPTATION OF BLOCKCHAIN CONSENSUS CRITERIA BASED ON A COMPUTING CONTEXT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A blockchain is a data structure that comprises a plurality of blocks that are linked in a sequence with each other. Each block in the blockchain comprises a data field, a hash of a previous block in the blockchain (except for the first block in the blockchain), a nonce value, a hash of the previous block in the blockchain, and a hash of the block itself calculated over its data content, the hash of the previous block, and its nonce. Public blockchains may be maintained by a coordinating group of computers that collectively validate the addition of new blocks through a process of consensus voting. A new block is deemed authenticated and hence appropriately added to the blockchain if more than 50% of the computers involved in the consensus voting approve of the new block.

SUMMARY

In an embodiment, a method of dynamically adapting a blockchain consensus criteria is disclosed. The method comprises evaluating a first computing context by a consensus criteria adaptation application executing on a computer, wherein the first context comprises a first current vulnerability to cyber threats and an operational importance of a first blockchain and, based on evaluating the first computing context, determining a first blockchain validity consensus criteria by the adaptation application, where the first consensus criteria identifies a first minimum number of consensus voting server computers, a first minimum percentage of approvals among voting server computers, and a first nonce calculation difficulty. The method further comprises applying the first consensus criteria to a first block requested to be added to the first blockchain and determining based on applying the first consensus criteria that the first block is approved to be added to the first blockchain. The method further comprises evaluating a second computing context by the consensus criteria adaptation application, wherein the second context comprises a second current vulnerability to cyber threats and an operational importance of a second blockchain and, based on evaluating the second computing context, determining a second blockchain validity consensus criteria by the adaptation application, where the second consensus criteria identifies a second minimum number of consensus voting server computers, a second minimum percentage of approvals among voting server computers, and a second nonce calculation difficulty. The method further comprises applying the second consensus criteria to a second block requested to be added to the second blockchain and determining based on applying the second consensus criteria that the second block is approved to be added to the second blockchain.

In another embodiment, a method of maintaining a blockchain based on adding new blocks subject to achieving a consensus among a plurality of consensus voting computers executing in a network slice, where the voting computers perform blockchain consensus arbitration based on a dynamically adapted consensus criteria is disclosed. The method comprises evaluating a computing context of a network slice by a consensus criteria adaptation application executing on a computer, where the network slice is used for maintaining blockchain consensus and, based on evaluating the computing context, adapting a blockchain validity consensus criteria by the adaptation application, where the consensus criteria identifies a minimum number of consensus voting server computers, a minimum percentage of approvals among voting server computers, and a nonce calculation difficulty. The method further comprises examining a block for addition to a blockchain by each of a plurality of consensus voting server computers executing in the network slice, wherein the plurality comprises a number at least as great as the minimum number of consensus voting server computers identified by the consensus criteria, determining the percentage of consensus voting server computers that approve adding the block to the blockchain, determining that the percentage of consensus voting server computers that approve adding the block to the blockchain is equal to or greater than the minimum percentage of approvals among voting server computers identified in the consensus criteria, and adding the block to the blockchain.

In yet another embodiment, a method of maintaining a blockchain based on adding new blocks subject to achieving a consensus among a plurality of consensus voting computers that satisfies a dynamically adapted consensus criteria. The method comprises evaluating a computing context by a consensus criteria adaptation application executing on a computer, and, based on evaluating the computing context, adapting a blockchain validity consensus criteria by the adaptation application, where the consensus criteria identifies a minimum number of consensus voting server computers and a minimum percentage of approvals among voting server computers. The method further comprises examining a block for addition to a blockchain by each of a plurality of consensus voting server computers, wherein the plurality comprises a number at least as great as the minimum number of consensus voting server computers identified by the consensus criteria, determining the percentage of consensus voting server computers that approve adding the block to the blockchain, determining that the percentage of consensus voting server computers that approve adding the block to the blockchain is equal to or greater than the minimum percentage of approvals among voting server computers identified in the consensus criteria, and adding the block to the blockchain.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
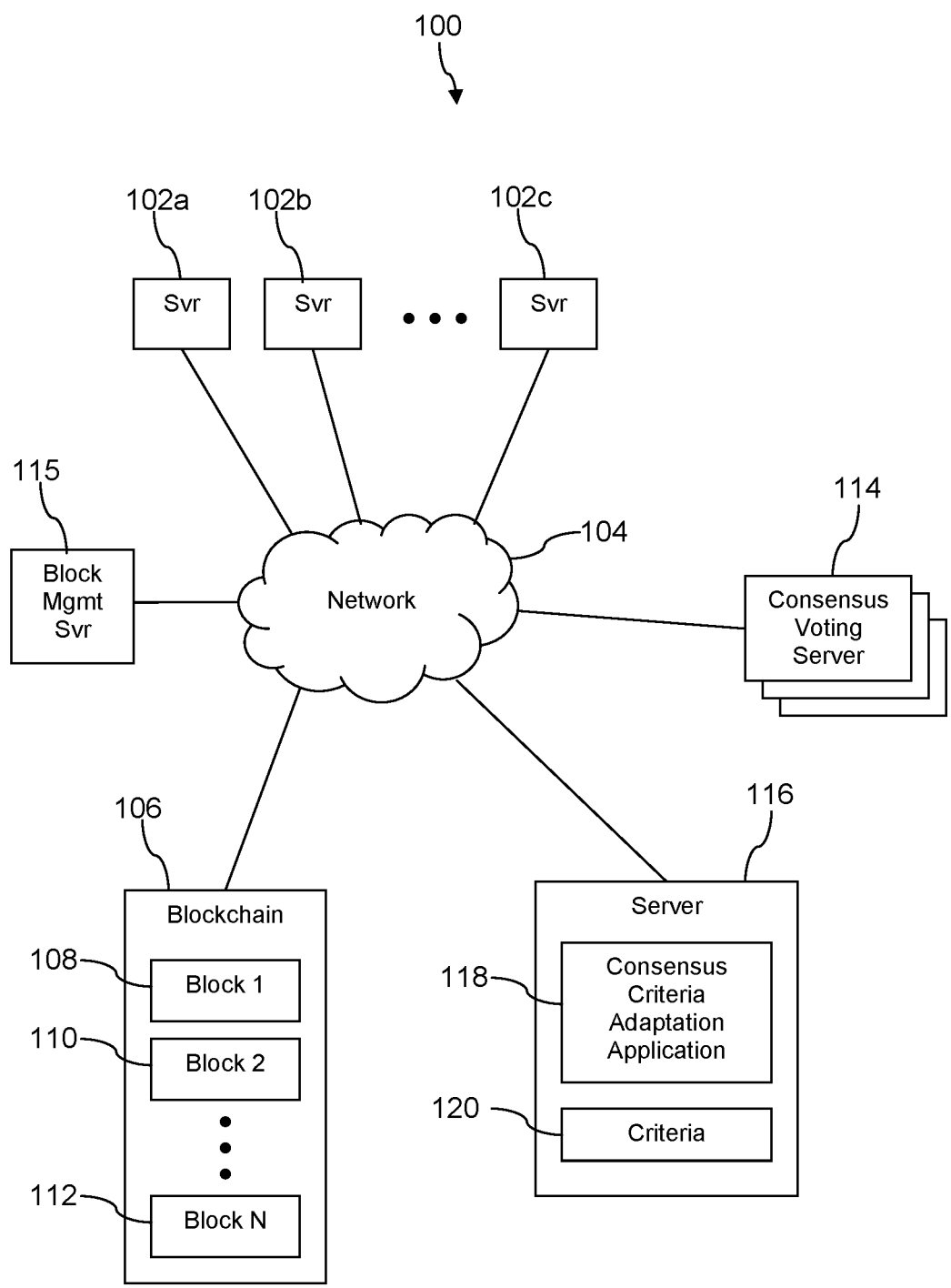
FIG. 1 is a block diagram of a computing system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Consensus in management of blockchains relates to establishing trust and confidence that the content of the blockchains is accurate and uncorrupted. Consensus can be sought on the question whether a new block may be validly added to an existing blockchain. Consensus can be sought on the question whether a blockchain is valid. It is inherent in the objective of seeking consensus in the management of blockchains that the content of a blockchain might be corrupted. For example, when a blockchain is used to implement a cyber currency and to maintain a record of holdings of the cyber currency by individuals, it is conceivable that a stakeholder in the cyber currency might attempt to falsify a block in the blockchain to the end of increasing his or her holding of the cyber currency.

Known blockchain processes employ a statically defined consensus criteria. Typically the consensus criterial is statically defined to be a simple majority of voting consensus computers. The present disclosure teaches dynamically adapting the blockchain consensus criteria based on a computing context in which the consensus is determined. For example, in a computing context where little is lost if the blockchain is corrupted, the consensus criteria may be weakened, and in a different computing context where much can be lost if the blockchain is corrupted, the consensus criteria may be strengthened. In an embodiment, the computing context may be assessed in each of a plurality of different contextual axes, for example in a vulnerability axis, in a consequence axis, and in a probability axis. The consensus criteria may be adapted in three different axes, for example in a minimum number of consensus voting computers, in a percentage of validation among the voting computers, and in a difficulty of nonce calculation. A consensus criteria adaptation application executes on a computer and repeatedly analyzes the current computing context associated with one or more blockchains and adapts one or more consensus criteria associated with the blockchains based on the results of its analysis. In an embodiment, a single consensus criteria applies to a plurality of different blockchains. In another embodiment, however, different consensus criteria may apply to at least some blockchains among a plurality of different blockchains.

In an embodiment, the consensus criteria relates to one or more private blockchains, for example one or more private blockchains maintained within the network domain of a single enterprise. The consensus criteria adaptation application may monitor a cyber threat level of the network domain of the enterprise maintaining the private blockchains. Monitoring the cyber threat level may comprise periodically obtaining a security report from a firewall that mediates the connection of the network domain to the public networks (e.g., the Internet). Monitoring the cyber threat level may comprise tracking a current volume of traffic on the network domain. Monitoring the cyber threat level may comprise tracking an average tenure of computers attached to the enterprise network. Monitoring the cyber threat level may comprise periodically obtaining a security report from one or more external cyber security analysis platforms, for example from a government cyber security organization, a third party cyber threat monitoring organization, or a third party cyber security consulting enterprise. The vulnerability of the consensus seeking mechanism may be determined by the consensus criteria adaptation application based on analyzing the cyber threat level of the network domain.

The consensus criteria adaptation application may keep track of the importance of integrity of the blockchains and the consequence of the blockchains being traduced. To some degree the importance of blockchain integrity and consequence of the blockchain integrity being compromised may be different for blockchains containing different content or blockchains supporting different kinds of activities. A first blockchain associated with a first business function may be associated with a first importance of blockchain integrity that is relatively fixed, while a second blockchain associated with a second business function may be associated with a second different importance of blockchain integrity that is itself relatively fixed. Alternatively, the importance of blockchain integrity may vary for the same blockchain at different times.

The consensus criteria application may assess the probability of one or more blockchains becoming invalid or corrupted. It is noted that a blockchain may become invalid or corrupted by deliberate action, for example by action of malware that has infiltrated a computing system. But a blockchain may become invalid or corrupted inadvertently or accidently, for example by the action of human error and/or of software error. A blockchain may become invalid or corrupted inadvertently as a result of a data glitch in the enterprise network.

The consensus criteria application may further determine a current spot-market price of electricity and factor this into the determination of the current computing context. For example, if electricity is less expensive, the consensus criteria application may adapt the consensus criteria to call for more consensus voting computers being involved in a consensus vote, and if electricity is less expensive, the consensus criteria application may adapt the consensus criteria to call for fewer consensus voting computers being involved in a consensus vote. In an embodiment, the consensus criteria application may adapt the minimum percentage of approvals based on the variation of the number of consensus voting computers. For example, if the spot-price of electricity increases, the consensus criteria application may decrease the minimum number of consensus voting computers identified in the consensus criteria from 9 voting computers while at the same time increasing the minimum percentage of approvals of the consensus criteria from 66% to 75%. It is understood that the cost of electricity is a significant operational cost of operating server computers.

In response to its assessment of the current computing context (e.g., its assessment of vulnerability, consequence, and probability), the consensus criteria adaptation application can modify the consensus criteria used to approve blockchains to better suit that context. When a vulnerability is decreased, or a consequence is decreased, and/or a probability is decreased, the adaptation application can make the consensus criteria more permissive or weaker. For example, the adaptation application may change the criteria from requiring a minimum of 7 consensus voting computers to 5 consensus voting computers, or from requiring agreement among a minimum of 75% of voting computers to 66% of voting computers, and/or from a first level of difficulty of nonce calculation to a second lower level of difficulty of nonce calculation. When a vulnerability is increased, or a consequence is increased, and/or a probability is increased, the adaptation application can make the consensus criteria less permissive or stronger. For example, the adaptation application may change the criteria from requiring a minimum of 3 consensus voting computers to 4 consensus voting computers, or from requiring agreement among a minimum of 51% of voting computers to 60% of voting computers, and/or from a third level of difficulty of nonce calculation to a fourth level of difficulty of nonce calculation.

In an embodiment, the computing of consensus voting and of consensus criteria adaptation is performed in a network slice. Confining the computing of consensus voting and of consensus criteria adaption to a network slice can promote security objectives of protecting the blockchain consensus seeking and maintenance processes from attacks. In an embodiment, the one or more private blockchains are maintained in the same network slice as the consensus seeking and maintaining activities. In another embodiment, private blockchains may be maintained in different network slices from the network slice used for consensus seeking and maintaining activities.

The system of dynamic adaptation of blockchain consensus criteria described herein addresses a technical computer problem—efficient use of both computing resources and efficient use of electricity—by applying a solution rooted in computer technology. The insight that the consensus criteria need not be "bullet proof" in all computing situations or computing contexts runs contrary to prevailing blockchain consensus wisdom but opens the door to balancing other competing objectives, allowing the computing system to be better optimized to the real-world computing environment. If the current computing context justifies reducing the number of computers involved in establishing consensus, some of those computers can instead be repurposed to perform other useful computing activities, thereby increasing the efficiency of the use of the population of computers. Alternatively, some of those computers not needed for establishing consensus may be turned off, thereby conserving electric power. At the same time, this solution does not simply expose an enterprise to more risk, because the solution explicitly addresses toughening the consensus criteria when risk is deemed to be higher: when new computers are added to the enterprise domain, when the firewall analysis indicates that malware threats are higher than normal, when the subject blockchain is a higher value or more critical information resource. The system of dynamic adaptation of blockchain consensus criteria may be said to raise the difficulty or processing burden on one hand—by adding the processing associated with monitoring and evaluating the computing context and of adapting consensus criteria accordingly—while on the other, more than recovering this overhead by the gain in efficiency in the determination of blockchain consensus. It is also pointed out that in some circumstances the system of dynamic adaptation of blockchain consensus may provide a more rigorous consensus criteria and hence a greater security for the blockchain than the traditional statically defined consensus criteria, for example when the system determines risks are increased and the system increases the rigor of the blockchain consensus criteria (e.g., by increasing the number of voting computers, by increasing the percentage agreement threshold, and/or by increasing the difficulty of determining the nonce).

Turning now to FIG. 1, a computing system 100 is described. In an embodiment, the system 100 comprises a plurality of server computers 102, a network 104, and a blockchain 106. The server computers 102 may comprise, for example, a first server 102a, a second server 102b, and a third server 102c. While three server computers 102 are illustrated in FIG. 1, it is understood that the system 100 may comprise any number of server computers 102. The blockchain 106 may be stored in a server computer or in a data store managed by a server computer, for example a server computer executing a database management system (DBMS) application. In an embodiment, the network 104 comprises one or more private networks, one or more public networks, or a combination thereof. Server computers and computer systems are described further hereinafter.

The blockchain 106 comprises a first block 108, a second block 110, and a third block 112. It is understood that the blockchain 106 may comprise any number of blocks. Each of the blocks 108, 110, 112 comprises a data component, a nonce value, and a hash value. With the exception of block 108, each of the blocks in the blockchain 106 further comprises a copy of the hash of the previous block in the blockchain. The hash value of a block is calculated over the data component, the nonce value, and (except the first block 108) the hash of the previous block. In an embodiment, the nonce value is determined such that the hash satisfies a format restriction, for example that the four most significant digits of the hash value are all zeros or that the three most significant digits of the hash value are all zeros, or that the two most significant digits of the hash value are all zeros. Varying the format restriction on the hash value may be said to be varying the nonce calculation difficulty, as finding a nonce for a block becomes more difficult as the format restriction is made stricter (e.g., more zero values in the most significant digits of the hash) and finding a nonce becomes easier as the format restriction is relaxed (e.g., fewer zero values in the most significant digits of the hash).

The servers 102 may generate blocks that they wish to be added to the blockchain 106. Before a new block may be added to the blockchain 106, in an embodiment, a consensus that the new block is valid must be determined based on evaluation of the new block by one or more consensus voting servers 114. Each of the consensus voting servers 114 called upon to vote in the determination of block validity analyzes the validity of the new block and either approves the new block or rejects the new block. If the determination of the consensus voting servers 114 satisfies a consensus criteria, the block is deemed valid and is added to the blockchain 106. If the determination of the consensus voting servers 114 does not satisfy the consensus criteria, the block is deemed invalid and is not added to the blockchain 106.

In an embodiment, the blockchain 106 is a private blockchain. A private blockchain may be a blockchain that is stored in an enterprise, for example in a communication network domain maintained by an enterprise. The private blockchain may be deemed a proprietary asset owned and/or managed by the enterprise. In some cases, an enterprise may allow other parties—for example clients or customers—to add blocks to, delete blocks from, and read blocks in the blockchain 106, for example in accordance with agreements between the enterprise and its clients or customers.

In an embodiment, a block management server 115 selects one or more consensus voting servers 114 for participating in a block validity consensus vote and determines the outcome of the voting procedure. If the block management server 115 determines that the consensus voting results satisfy the consensus criteria, the block management server 115 adds the new block to the blockchain 106. If the block management server 115 determines that the consensus voting results do not satisfy the consensus criteria, the block management server 115 does not add the new block to the blockchain 106. The block management server 115 may propagate the nonce calculation difficulty of the consensus criteria 120 to the servers 102 that are involved in generating blocks. The block management server 115 may further propagate the nonce calculation difficulty of the consensus criteria 120 to the consensus voting servers 114. In an embodiment, the operations described here as being performed by the block management server 115 may instead be performed by the consensus criteria adaptation application 118 or another application executing on the server 116.

The system 100 further comprises a server 116 that executes a consensus criteria adaptation application 118 that dynamically adapts a consensus criteria 120. The consensus criteria 120 is propagated to the block management server 115 for use in evaluating the consensus voting results. Alternatively, in an embodiment, the block management server 115 requests the server 116 to provide the consensus criteria 120 to it periodically or on each event of initiating a consensus vote.

The consensus criteria adaptation application 118 may be referred to as the application 118 hereinafter in the interests of brevity. The application 118 monitors a computing context associated with the servers 102, the blockchain 106, and the consensus voting servers 114. This computing context may generally be considered to militate for different consensus criteria as it changes. For example, if the computing context is consistent with low risk that the blockchain 106 may be corrupted, that would militate for a more relaxed, a more permissive, a less restrictive consensus criteria. If a less restrictive consensus criteria can be used, computing resources may be used more efficiently. For example, computing resources that would otherwise be committed to consensus voting may be applied to other computing processes. In another circumstance, however, the computing context is consistent with high risk that the blockchain 106 may be corrupted, that would militate for a less relaxed, a less permissive, a more restrictive consensus criteria.

In an embodiment, the consensus criteria 120 identifies a minimum number of consensus voting servers 114 that may participate in a consensus vote, identifies a minimum percentage of participating consensus voting servers 114 that validate a new block, and a nonce calculation difficulty. The consensus criteria 120 may identify the minimum number of consensus voting servers 114 as two, three, five, seven, eleven, or more servers. The consensus criteria 120 may identify the minimum percentage of participating consensus voting servers 114 as more than 50% and less than 100%, greater than 60%, greater than 66%, greater than 75%, or some other percentage greater than 50% and less than 100%. The consensus criteria 120 may identify the minimum percentage of participating consensus voting servers 114 as 100% (e.g., the consensus criteria may mandate a unanimous consensus vote). The consensus criteria 120 may identify the nonce calculation difficulty in terms of a format restriction of the hash of the block, for example a number of zeros in the most significant digits of the hash.

The application 118 may evaluate the computing context according to a plurality of parameters related to the system. The application 118 may monitor a cyber threat level of the system 100. Monitoring the cyber threat level may comprise periodically obtaining a security report from a firewall that mediates the connection of a network domain comprising the servers 102, 114, 115, 116 to the network 104. The security report from the firewall may summarize a number of rejected messages in-bound to the network domain, a frequency of changes to a blacklist of addresses maintained by the firewall, and other information. Monitoring the cyber threat level may comprise tracking a current volume of traffic in the network domain comprising the servers 102, 114, 115, 116. Monitoring the cyber threat level may comprise tracking an average tenure of computers attached to the network domain comprising the servers 102, 114, 115, 116, including computers that are not servers—for example desktop computers, laptop computers, tablet computers, wearable computers, and mobile communication devices communicatively coupled to the network domain. The tenure of a computer may be the duration of time the computer has been known to the network domain. It may be that the introduction of a computer into a network domain for the first time is associated with an elevated chance that this computer will present a cyber threat versus the risks associated with a like computer that by contrast has been known to the network domain for an extended period of time. Monitoring the cyber threat level may comprise periodically obtaining a security report from one or more external cyber security analysis platforms. The vulnerability of the blockchain 106 and the consensus voting servers 114 may be evaluated by the application 118 based in part on analyzing the cyber threat level. The application 118 may periodically or quasi-continuously redetermine the cyber threat level of the system 100.

The application 118 may evaluate a possible consequence of the blockchain 106 being corrupted. The consequence of corruption of a first blockchain may be trivial and not associated with either significant disruption to enterprise operations and not associated to significant costs. For example, a blockchain that records an hour's worth of web browser searches of mobile phone users may be lost without great cost and without severe impact on enterprise operations. The consequence of corruption of a second blockchain may be both extensive and costly to repair. For example, loss or corruption of a blockchain that records an hour's worth of trades in a major stock exchange would be significant. The evaluation of the consequences of an error in the blockchain 106 may take into account the number of servers 102 and/or applications that either add blocks to the blockchain 106 or that make use of information obtained from blocks on the blockchain 106.

The application 118 may evaluate the probability that the blockchain 106 will be corrupted. This probability may be related to how long the consensus voting servers 114 have been in service (i.e., a tenure of the consensus voting servers 114 or an average tenure of the consensus voting servers 114). For example, when two new consensus voting servers 114 have been added to the system 100, the application 118 may deem the probability of corruption of the blockchain 106 to be higher than after the two new consensus voting servers 114 have been engaged in consensus voting for an extended period of time, for example after the two new consensus voting servers 114 have been in service for two weeks. Evaluating the probability may comprise evaluating the probability that a cyber threat may attack the system 100 and corrupt the blockchain 106. In an embodiment, the evaluation of probability that the blockchain 106 will be corrupted is based in part on the tenure of the most recently added consensus voting server 114 and disregards the tenure of consensus voting servers 114 that have been installed longer.

By evaluating the computing context of the system 100 in terms of a cyber threat level of the system 100, a consequence level for corruption of the blockchain 106, and a probability of corruption of the blockchain 106, the application 118 can adapt the consensus criteria 120 to fit the current computing context of the system 100. The application 118 may update the consensus criteria 120 quasi-continuously. The application 118 may update the consensus criteria 120 periodically, for example about every minute, about every five minutes, about every fifteen minutes, about every hour, about every four hours, about daily, or about weekly.

When a new block is added to the blockchain 106 by the block management server 115, the block management server 115 may attach metadata to the newly added block that identifies the consensus criteria 120 that was used to establish consensus on the validity of that block. Thus, when a first new block is added, the block management server 115 may attach a first item of metadata to the first new block identifying a first consensus criteria. When a second new block is added, the block management server 115 may attach a second item of metadata to the second new block identifying a second consensus criteria, where the second consensus criteria is different from the first consensus criteria.

Figure 2:
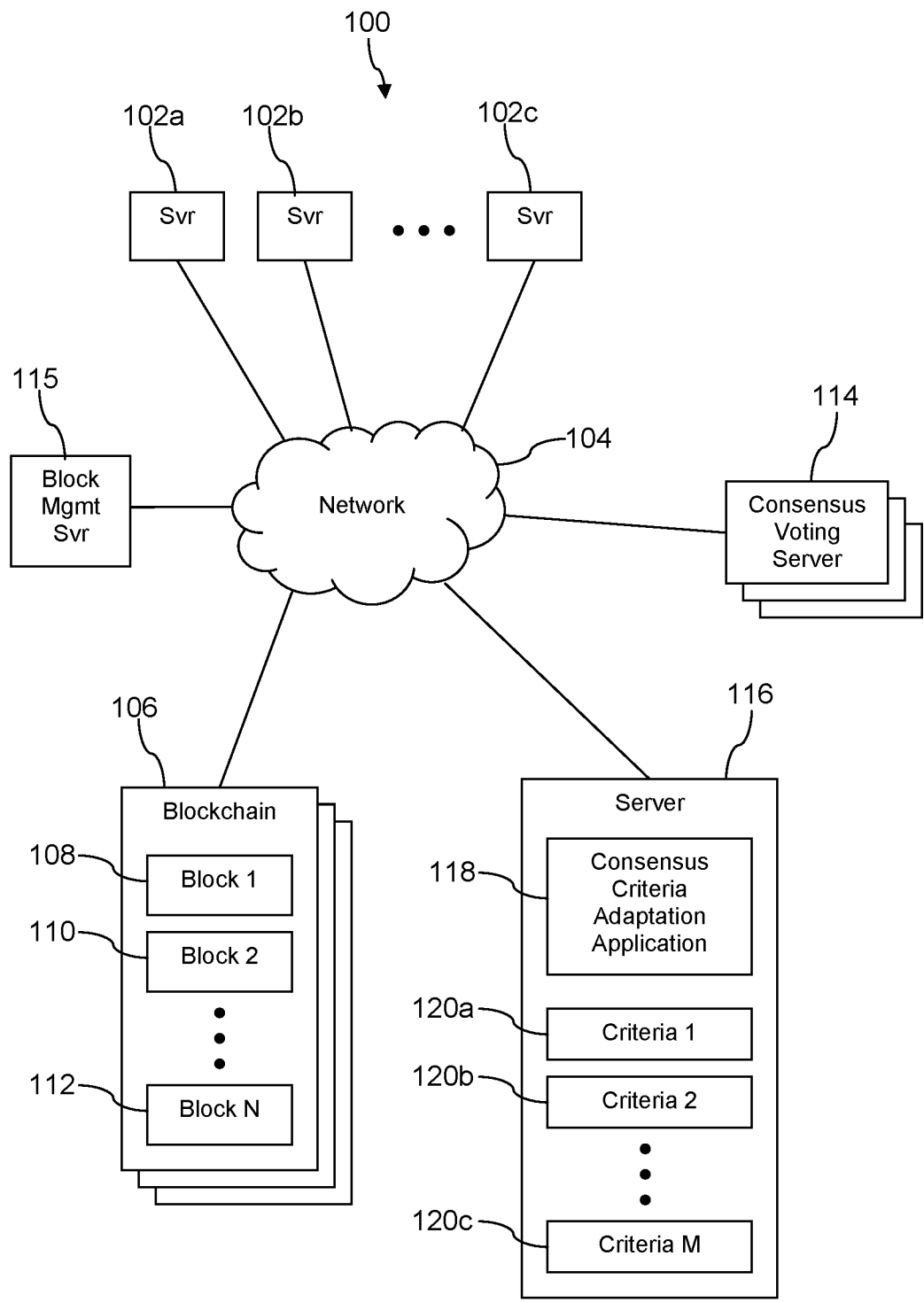
FIG. 2 is a block diagram of another computing system according to an embodiment of the disclosure.

Turning now to FIG. 2, a different embodiment, of the system 100 is described. The system 100 of FIG. 2 is substantially similar to the system 100 described with reference to FIG. 1, except that FIG. 2 comprises a plurality of blockchains 106. Additionally, in the embodiment of FIG. 2, the consensus criteria adaptation application 118 determines a plurality of different consensus criteria 120, for example a first consensus criteria 120a, a second consensus criteria 120b, and a third consensus criteria 120c. Different consensus criteria 120a, 120b, 120c are associated with different blockchains 106. Some ones of the consensus criteria 120a, 120b, 120c may be associated with a single blockchain 106. Other ones of the consensus criteria 120a, 120b, 120c may be associated with a plurality of the blockchains 106 but not all of the blockchains 106.

Figure 3:
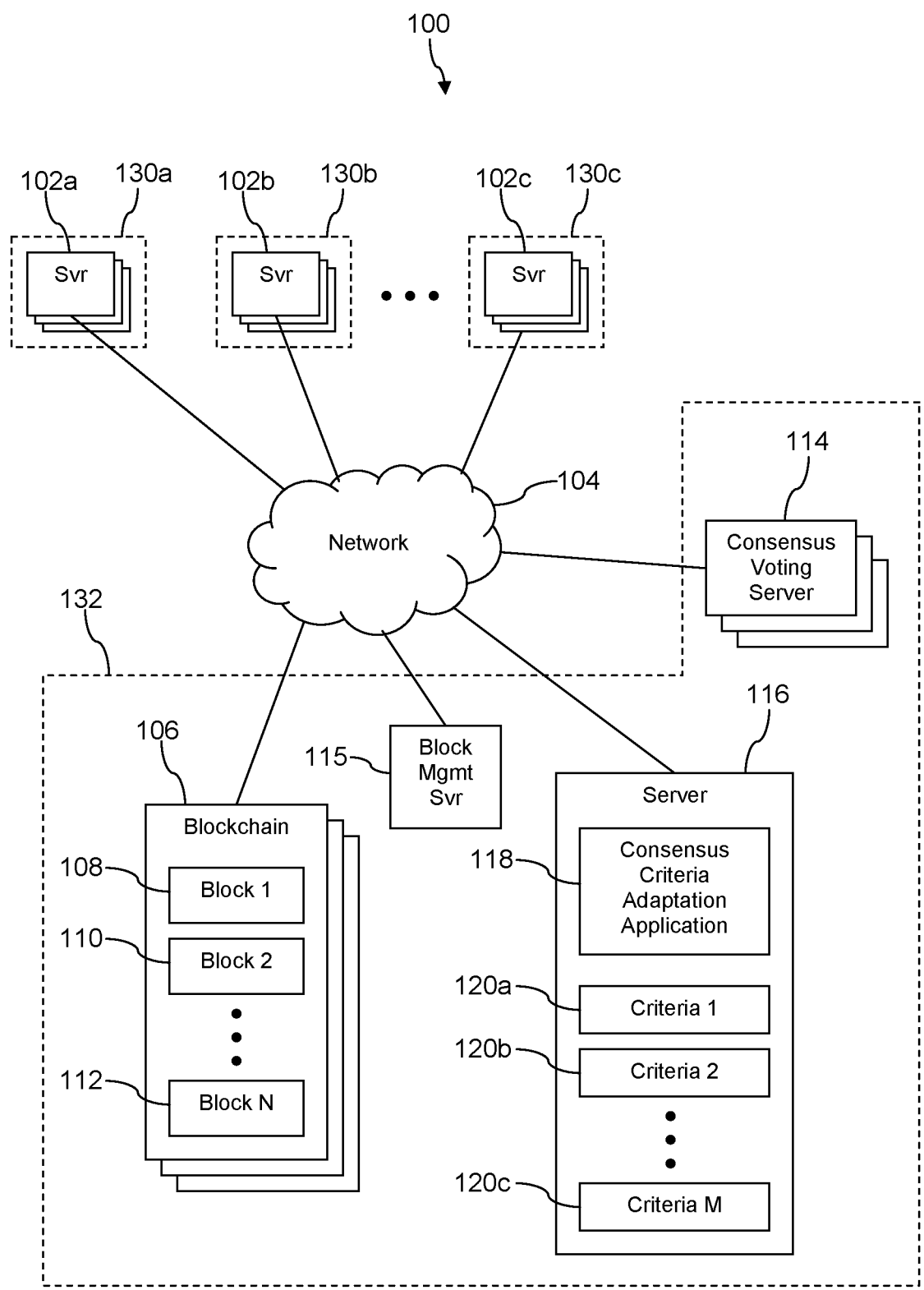
FIG. 3 is a block diagram of yet another computing system according to an embodiment of the disclosure.

Turning now to FIG. 3, a different embodiment of the system 100 is described. The system 100 of FIG. 3 is substantially similar to the system 100 described with reference to FIG. 2, except that FIG. 3 illustrates the blockchain 106 and the servers 114, 115, 116 being provided by a first network slice 132. Network slices may be provided by wireless communication service providers to promote efficient delivery of services. Network slices may promote isolation of computational processes from each other whereby to assist in securing those isolated processes. In an embodiment, a first plurality of servers 102a may execute in a second network slice 130a, a second plurality of servers 102b may execute in a third network slice 130b, and a third plurality of servers 102c may execute in a fourth network slice 130c.

Figure 4A:
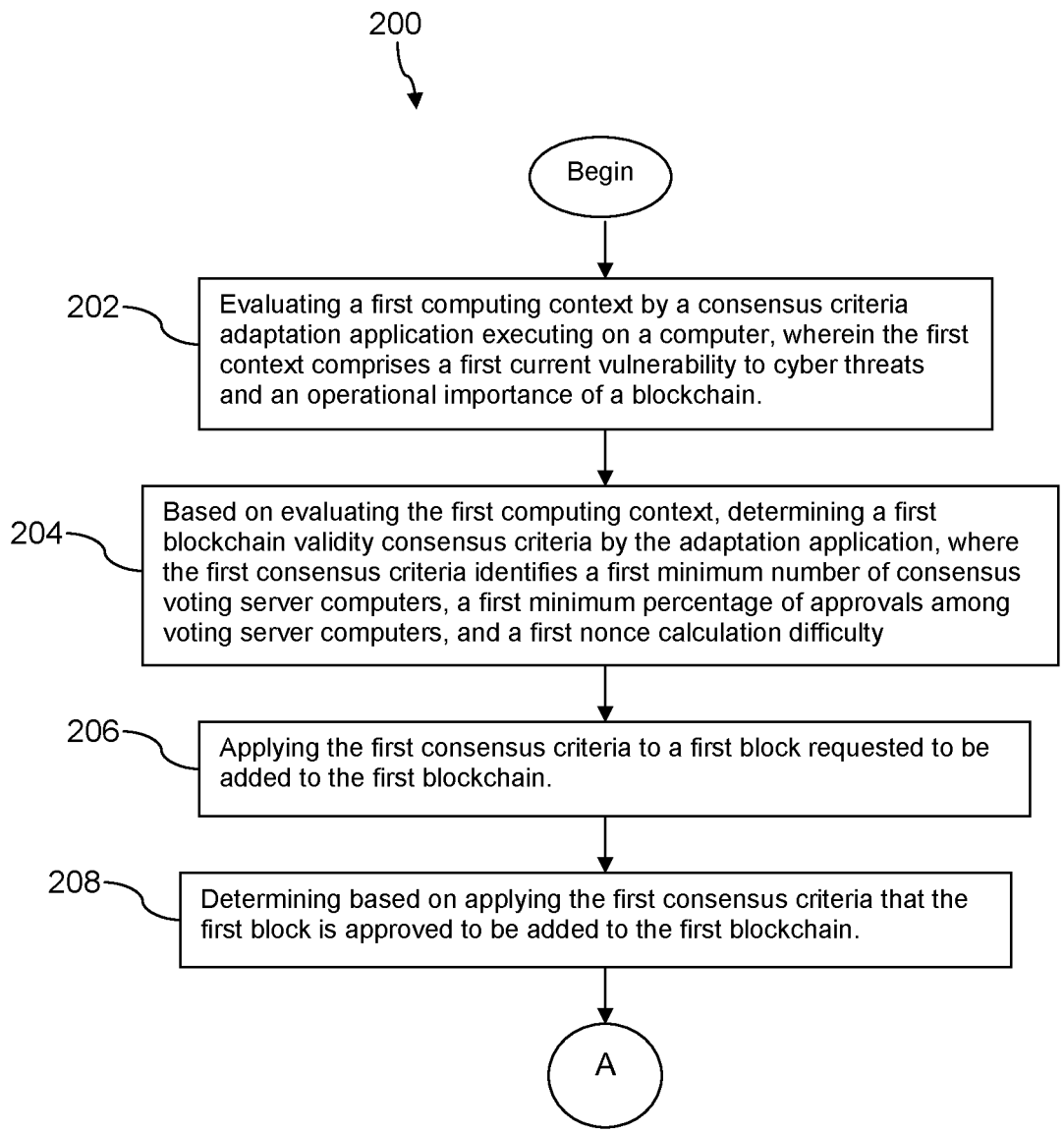
FIGS. 4A and 4B are a flow chart of a method according to an embodiment of the disclosure.
Figure 4B:
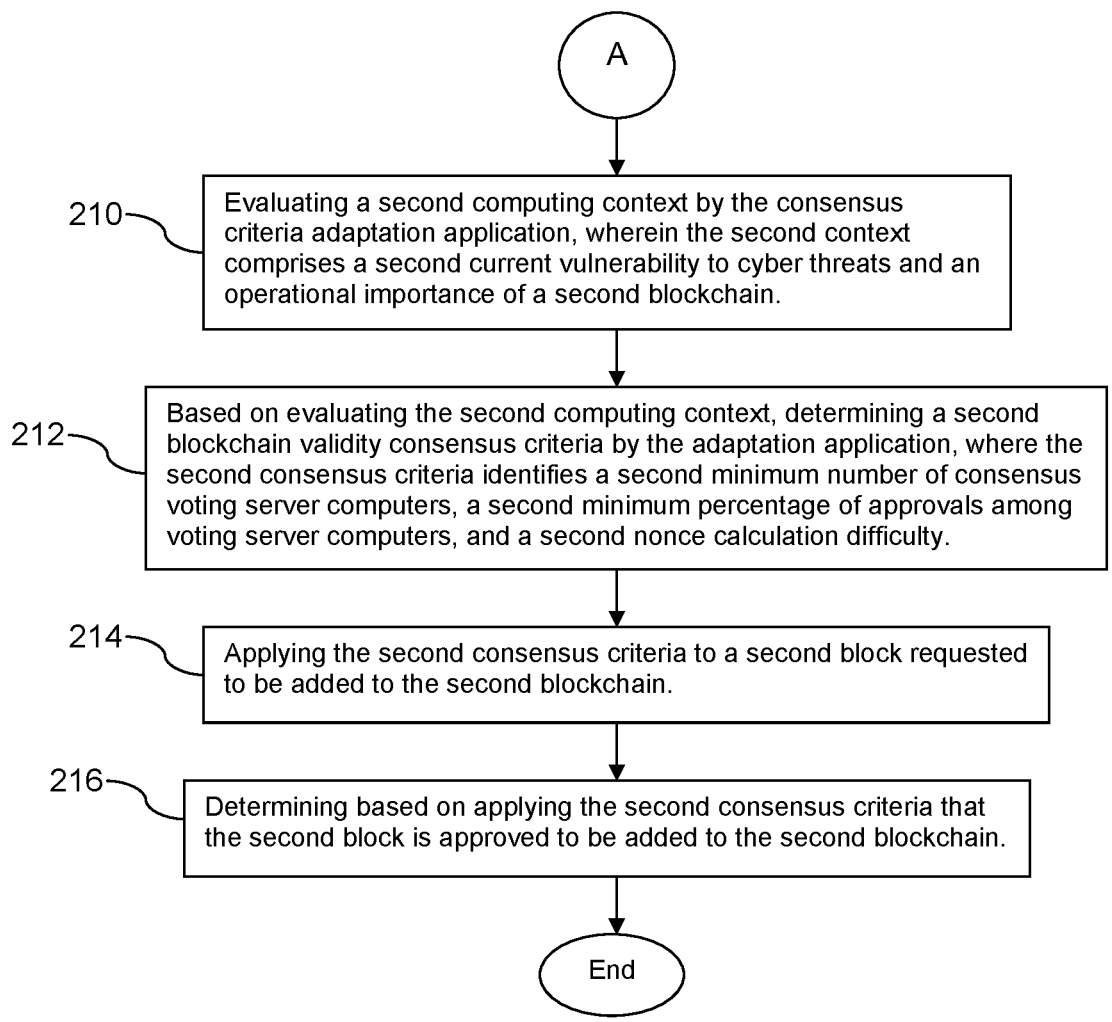

Turning now to FIG. 4A and FIG. 4B, a method 200 is described. In an embodiment, the method 200 is a method of dynamically adapting a blockchain consensus criteria. At block 202, the method 200 comprises evaluating a first computing context by a consensus criteria adaptation application executing on a computer, wherein the first context comprises a first current vulnerability to cyber threats and an operational importance of a first blockchain. The operational importance may be related to or based on an operational consequence if the blockchain is corrupted. In an embodiment, the first context further comprises a first current probability of an occurrence of cyber threats. In an embodiment, evaluating the first computing context comprises evaluating the first current vulnerability based in part on a first tenure of consensus voting computers. In an embodiment, evaluating the first computing context comprises evaluating the first current vulnerability based in part on analyzing a first security report received from a firewall. In an embodiment, evaluating the first computing context comprises evaluating the first current vulnerability based in part on analyzing a third security report received from a cyber threat monitoring organization. In an embodiment, evaluating the first computing context comprises evaluating a first spot-market price of electricity.

At block 204, the method 200 comprises, based on evaluating the first computing context, determining a first blockchain validity consensus criteria by the adaptation application, where the first consensus criteria identifies a first minimum number of consensus voting server computers, a first minimum percentage of approvals among voting server computers, and a first nonce calculation difficulty. At block 206, the method 200 comprises applying the first consensus criteria to a first block requested to be added to the first blockchain.

At block 208, the method 200 comprises determining based on applying the first consensus criteria that the first block is approved to be added to the first blockchain. At block 210, the method 200 comprises evaluating a second computing context by the consensus criteria adaptation application, wherein the second context comprises a second current vulnerability to cyber threats and an operational importance of a second blockchain. In an embodiment, the second context further comprises a second current probability of an occurrence of cyber threats. In an embodiment, evaluating the second computing context comprises evaluating the second current vulnerability based in part on a second tenure of consensus voting computers. In an embodiment, evaluating the second computing context comprises evaluating the second current vulnerability based in part on analyzing a second security report received from the firewall. In an embodiment, evaluating the second computing context comprises evaluating the second current vulnerability based in part on analyzing a fourth security report received from the cyber threat monitoring organization. In an embodiment, evaluating the second computing context comprises evaluating a second spot-market price of electricity.

At block 212, the method 200 comprises, based on evaluating the second computing context, determining a second blockchain validity consensus criteria by the adaptation application, where the second consensus criteria identifies a second minimum number of consensus voting server computers, a second minimum percentage of approvals among voting server computers, and a second nonce calculation difficulty. At block 214, the method 200 comprises applying the second consensus criteria to a second block requested to be added to the second blockchain. At block 216, the method 200 comprises determining based on applying the second consensus criteria that the second block is approved to be added to the second blockchain.

In an embodiment, applying the first consensus criteria to the first block, determining that the first block is approved to be added to the first blockchain, applying the second consensus criteria to the second block, and determining that the second block is approved to be added to the second blockchain is performed by a block management server computer. In an embodiment, the method 200 further comprises selecting a first plurality of consensus voting server computers by the block management server computer based on the first minimum number of consensus voting server computers identified by the first consensus criteria, providing the first block by the block management server computer to each of the first plurality of consensus voting server computers, and receiving a first plurality of votes by the block management server computer from each of the first plurality of consensus voting server computers, wherein applying the first consensus criteria to the first block by the block management server computer comprises evaluating the first plurality of votes based on the first consensus criteria. In an embodiment, the method 200 further comprises selecting a second plurality of consensus voting server computers by the block management server computer based on the second minimum number of consensus voting server computers identified by the second consensus criteria, providing the second block by the block management server computer to each of the second plurality of consensus voting server computers, and receiving a second plurality of votes by the block management server computer from each of the second plurality of consensus voting server computers, wherein applying the second consensus criteria to the second block by the block management server computer comprises evaluating the second plurality of votes based on the second consensus criteria. In an embodiment, the method 200 further comprises promulgating the first nonce calculation difficulty by the block management server computer to a plurality of server computers that generate blocks and promulgating the second nonce calculation difficulty by the block management server computer to the plurality of server computers that generate blocks.

Figure 5:
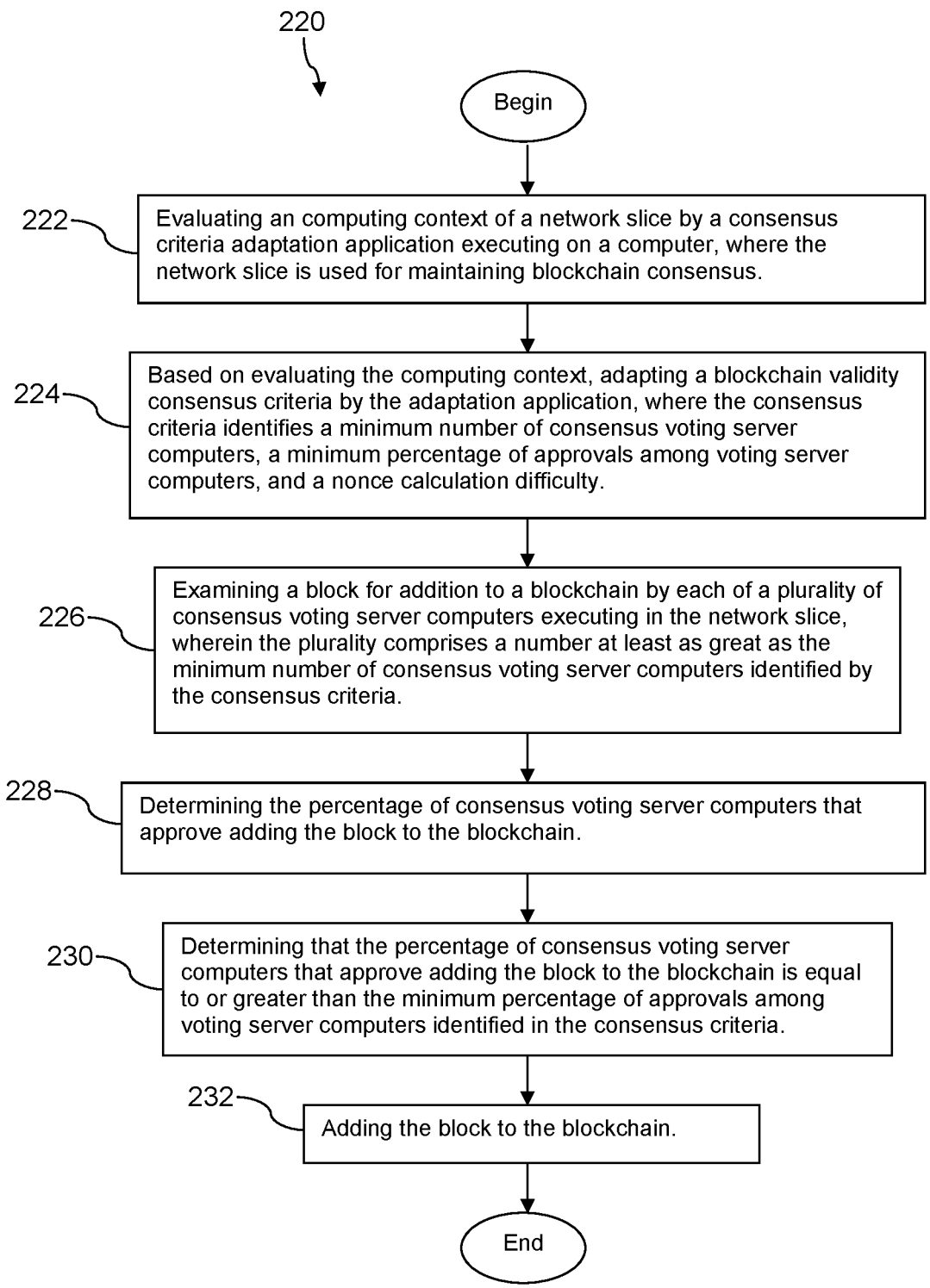
FIG. 5 is a flow chart of another method according to an embodiment of the disclosure.

Turning now to FIG. 5, a method 220 is described. In an embodiment, the method 220 comprises a method of maintaining a blockchain based on adding new blocks subject to achieving a consensus among a plurality of consensus voting computers executing in a network slice, where the voting computers perform blockchain consensus arbitration based on a dynamically adapted consensus criteria. At block 222, the method 220 comprises evaluating a computing context of a network slice by a consensus criteria adaptation application executing on a computer, where the network slice is used for maintaining blockchain consensus.

At block 224, the method 220 comprises, based on evaluating the computing context, adapting a blockchain validity consensus criteria by the adaptation application, where the consensus criteria identifies a minimum number of consensus voting server computers, a minimum percentage of approvals among voting server computers, and a nonce calculation difficulty. At block 226, the method 220 comprises examining a block for addition to a blockchain by each of a plurality of consensus voting server computers executing in the network slice, wherein the plurality comprises a number at least as great as the minimum number of consensus voting server computers identified by the consensus criteria.

At block 228, the method 220 comprises determining the percentage of consensus voting server computers that approve adding the block to the blockchain. At block 230, the method 220 comprises determining that the percentage of consensus voting server computers that approve adding the block to the blockchain is equal to or greater than the minimum percentage of approvals among voting server computers identified in the consensus criteria. At block 232, the method 220 comprises adding the block to the blockchain.

Figure 6:
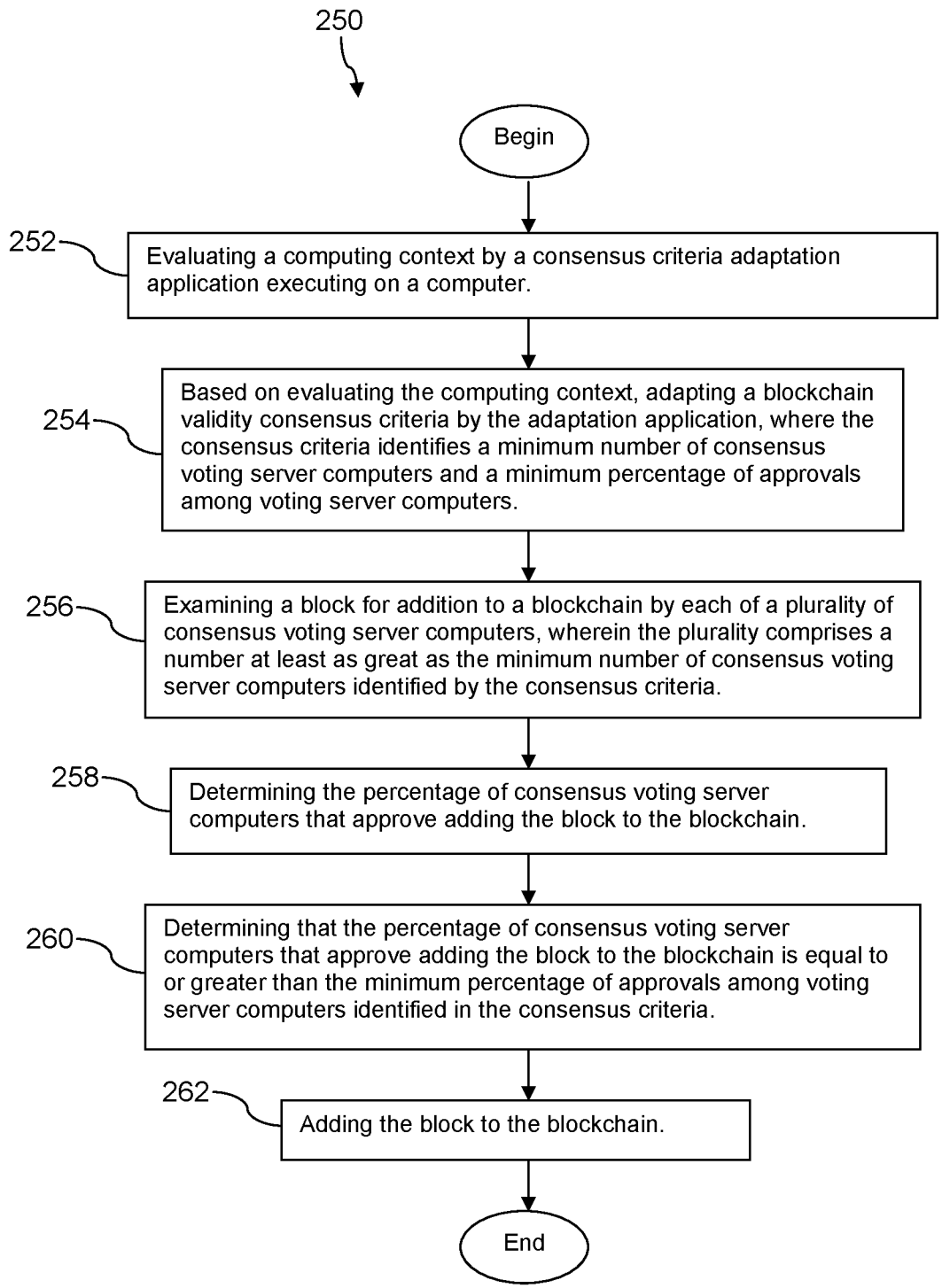
FIG. 6 is a flow chart of yet another method according to an embodiment of the disclosure.

Turning now to FIG. 6, a method 250 is described. In an embodiment, the method 250 is a method of maintaining a blockchain based on adding new blocks subject to achieving a consensus among a plurality of consensus voting computers that satisfies a dynamically adapted consensus criteria. At block 252, the method 250 comprises evaluating a computing context by a consensus criteria adaptation application executing on a computer.

At block 254, the method 250 comprises, based on evaluating the computing context, adapting a blockchain validity consensus criteria by the adaptation application, where the consensus criteria identifies a minimum number of consensus voting server computers and a minimum percentage of approvals among voting server computers. At block 256, the method 250 comprises examining a block for addition to a blockchain by each of a plurality of consensus voting server computers, wherein the plurality comprises a number at least as great as the minimum number of consensus voting server computers identified by the consensus criteria.

At block 258, the method 250 comprises determining the percentage of consensus voting server computers that approve adding the block to the blockchain. At block 260, the method 250 comprises determining that the percentage of consensus voting server computers that approve adding the block to the blockchain is equal to or greater than the minimum percentage of approvals among voting server computers identified in the consensus criteria. At block 262, the method 250 comprises adding the block to the blockchain.

Figure 7:
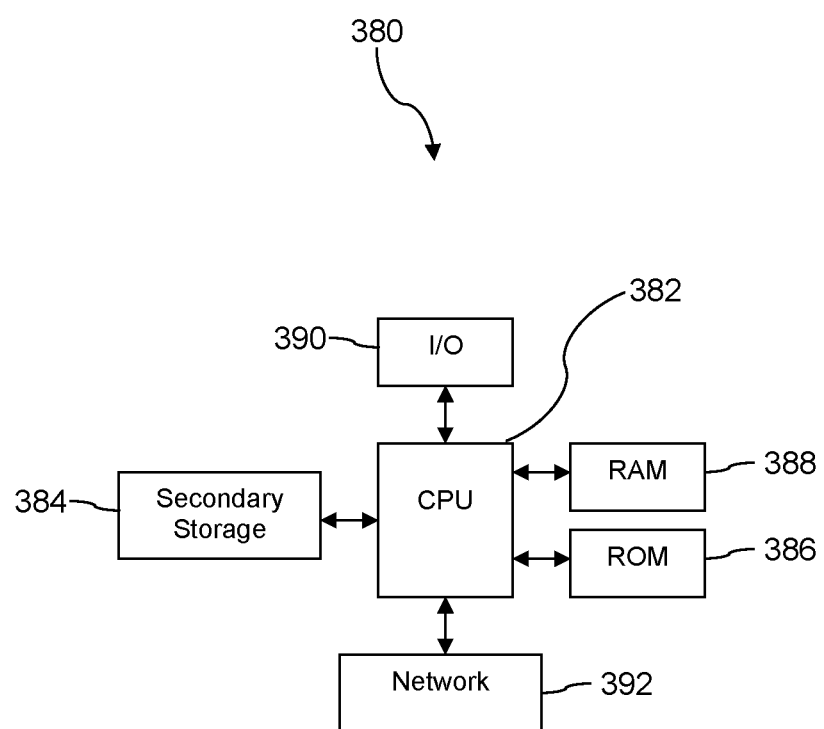
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable system interface specification (DOCSIS), wave division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), or radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using the processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from a hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other devices, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of dynamically adapting a blockchain consensus criteria, comprising:

evaluating a first computing context by a consensus criteria adaptation application executing on a computer, wherein the first context comprises a first current vulnerability to cyber threats and an operational importance of a first blockchain;

based on evaluating the first computing context, determining a first blockchain validity consensus criteria by the adaptation application, where the first consensus criteria identifies a first minimum number of consensus voting server computers, a first minimum percentage of approvals among voting server computers, and a first nonce calculation difficulty;

applying the first consensus criteria to a first block requested to be added to the first blockchain;

determining based on applying the first consensus criteria that the first block is approved to be added to the first blockchain;

evaluating a second computing context by the consensus criteria adaptation application, wherein the second context comprises a second current vulnerability to cyber threats and an operational importance of a second blockchain;

based on evaluating the second computing context, determining a second blockchain validity consensus criteria by the adaptation application, where the second consensus criteria identifies a second minimum number of consensus voting server computers, a second minimum percentage of approvals among voting server computers, and a second nonce calculation difficulty;

applying the second consensus criteria to a second block requested to be added to the second blockchain; and determining based on applying the second consensus criteria that the second block is approved to be added to the second blockchain.

2. The method of claim 1, wherein the first context further comprises a first current probability of an occurrence of cyber threats, and wherein the second context further comprises a second current probability of an occurrence of cyber threats.

3. The method of claim 1, wherein the evaluating the first computing context comprises evaluating the first current vulnerability based in part on a first tenure of consensus voting computers, and wherein the evaluating the second computing context comprises evaluating the second current vulnerability based in part on a second tenure of consensus voting computers.

4. The method of claim 1, wherein evaluating the first computing context comprises evaluating the first current vulnerability based in part on analyzing a first security report received from a firewall, and wherein evaluating the second computing context comprises evaluating the second current vulnerability based in part on analyzing a second security report received from the firewall.

5. The method of claim 4, wherein evaluating the first computing context comprises evaluating the first current vulnerability based in part on analyzing a third security report received from a cyber threat monitoring organization, and wherein evaluating the second computing context comprises evaluating the second current vulnerability based in part on analyzing a fourth security report received from the cyber threat monitoring organization.

6. The method of claim 1, wherein applying the first consensus criteria to the first block, determining that the first block is approved to be added to the first blockchain, applying the second consensus criteria to the second block, and determining that the second block is approved to be added to the second blockchain is performed by a block management server computer.

7. The method of claim 6, further comprising:
selecting a first plurality of consensus voting server computers by the block management server computer based on the first minimum number of consensus voting server computers identified by the first consensus criteria;
providing the first block by the block management server computer to each of the first plurality of consensus voting server computers;
receiving a first plurality of votes by the block management server computer from each of first plurality of consensus voting server computers;
selecting a second plurality of consensus voting server computers by the block management server computer based on the second minimum number of consensus voting server computers identified by the second consensus criteria;
providing the second block by the block management server computer to each of the second plurality of consensus voting server computers; and
receiving a second plurality of votes by the block management server computer from each of second plurality of consensus voting server computers,
wherein applying the first consensus criteria to the first block by the block management server computer comprises evaluating the first plurality of votes based on the first consensus criteria, and
wherein applying the second consensus criteria to the second block by the block management server computer comprises evaluating the second plurality of votes based on the second consensus criteria.

8. The method of claim 6, wherein the method further comprises:
promulgating the first nonce calculation difficulty by the block management server computer to a plurality of server computers that generate blocks; and
promulgating the second nonce calculation difficulty by the block management server computer to the plurality of server computers that generate blocks.

9. The method of claim 1, wherein the nonce calculation difficulty is associated with a restriction on the format of a hash of the block.

10. The method of claim 1, wherein evaluating the first computing context comprises evaluating a first spot-market price of electricity, and wherein evaluating the second computing context comprises evaluating a second spot-market price of electricity.

11. A method of maintaining a blockchain based on adding new blocks subject to achieving a consensus among a plurality of consensus voting computers executing in a network slice, where the voting computers perform blockchain consensus arbitration based on a dynamically adapted consensus criteria, comprising:
evaluating a computing context of a network slice by a consensus criteria adaptation application executing on a computer, where the network slice is used for maintaining blockchain consensus, wherein evaluating the computing context comprises determining a current spot-market price of electricity;
based on evaluating the computing context, adapting a blockchain validity consensus criteria by the adaptation application, where the consensus criteria identifies a minimum number of consensus voting server computers, a minimum percentage of approvals among voting server computers, and a nonce calculation difficulty;
examining a block for addition to a blockchain by each of a plurality of consensus voting server computers executing in the network slice, wherein the plurality comprises a number at least as great as the minimum number of consensus voting server computers identified by the consensus criteria;
determining the percentage of consensus voting server computers that approve adding the block to the blockchain;
determining that the percentage of consensus voting server computers that approve adding the block to the blockchain is equal to or greater than the minimum percentage of approvals among voting server computers identified in the consensus criteria; and
adding the block to the blockchain.

12. The method of claim 11, wherein the minimum percentage of approvals among voting server computers of a first blockchain validity consensus criteria at a first time is 66% of voting computers, and wherein the minimum percentage of approvals among voting server computers of a second blockchain validity consensus criteria at a second time is 75% of voting computers.

13. The method of claim 11, wherein the minimum percentage of approvals among voting server computers of a third blockchain validity consensus criteria at a third time is 100% of voting computers.

14. The method of claim 11, wherein the blockchain is a private blockchain.

15. The method of claim 11, wherein the consensus criteria adaptation application executes on a computer that executes in the network slice.

16. A method of maintaining a blockchain based on adding new blocks subject to achieving a consensus among a plurality of consensus voting computers that satisfies a dynamically adapted consensus criteria, comprising:
evaluating a computing context by a consensus criteria adaptation application executing on a computer, wherein evaluating the computing context comprises determining a current spot-market price of electricity;
based on evaluating the computing context, adapting a blockchain validity consensus criteria by the adaptation application, where the consensus criteria identifies a minimum number of consensus voting server computers and a minimum percentage of approvals among voting server computers;

examining a block for addition to a blockchain by each of a plurality of consensus voting server computers, wherein the plurality comprises a number at least as great as the minimum number of consensus voting server computers identified by the consensus criteria;

determining the percentage of consensus voting server computers that approve adding the block to the blockchain;

determining that the percentage of consensus voting server computers that approve adding the block to the blockchain is equal to or greater than the minimum percentage of approvals among voting server computers identified in the consensus criteria; and adding the block to the blockchain.

17. The method of claim 16, wherein determining the percentage of consensus voting server computers that approve adding the block to the blockchain and determining that the percentage of consensus voting server computers that approve adding the block to the blockchain is equal to or greater than the minimum percentage of approvals among voting server computers identified in the consensus criteria is performed by an application executing on the same computer that the adaptation application executes on.

18. The method of claim 16, wherein the adaptation application adapts the blockchain validity consensus criteria periodically.

19. The method of claim 18, wherein the adaptation application adapts the blockchain validity consensus criteria between every five minutes and every four hours.

* * * * *